(No Model.)
W. L. EVERIT, Jr.
REFRIGERATOR.
No. 423,677. Patented Mar. 18, 1890.
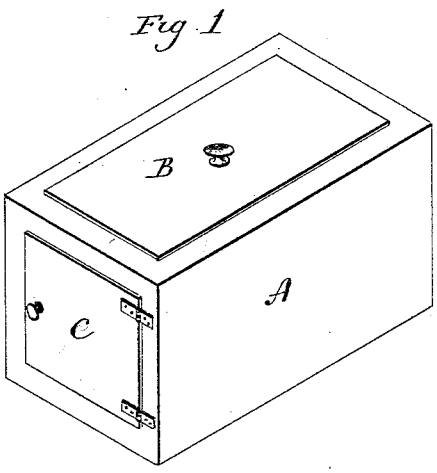
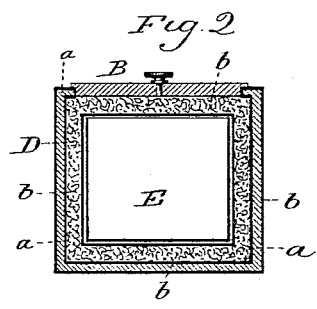
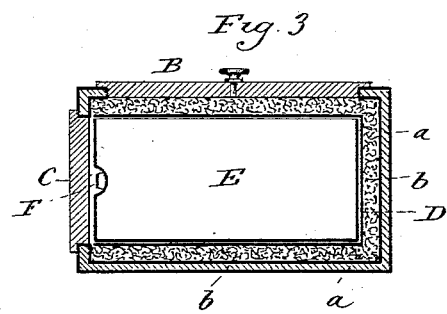
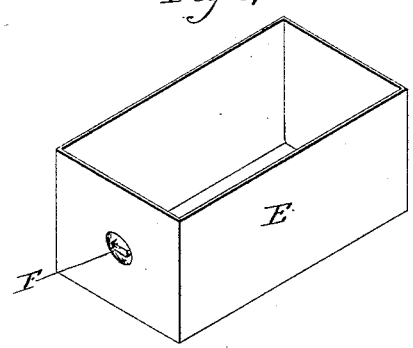
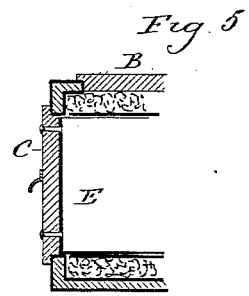
Witnesses
J. H. Shumway
Fred C. Earle
William L. Everit
By atty. Inventor

UNITED STATES PATENT OFFICE.

WILLIAM L. EVERIT, JR., OF NEW HAVEN, CONNECTICUT, ASSIGNOR OF ONE-HALF TO AUGUST F. WALTZINGER, JR., OF SAME PLACE.

REFRIGERATOR.

SPECIFICATION forming part of Letters Patent No. 423,677, dated March 18, 1890.

Application filed June 17, 1889. Serial No. 314,613. (No model.)

*To all whom it may concern:*

Be it known that I, WILLIAM L. EVERIT, Jr., of New Haven, in the county of New Haven and State of Connecticut, have invented a new Improvement in Refrigerators; and I do hereby declare the following, when taken in connection with accompanying drawings and the letters of reference marked thereon, to be a full, clear, and exact description of the same, and which said drawings constitute part of this specification, and represent in—

Figure 1, a perspective view of the refrigerator complete; Fig. 2, a transverse vertical central section; Fig. 3, a longitudinal vertical central section; Fig. 4, a perspective view of the cream-vessel removed, and Fig. 5 a modification.

This invention relates to an improvement in refrigerators having special reference to an apparatus to keep ice-cream in a frozen condition for unlimited time, as for family use, but more particularly designed for use at soda-fountains, where frequent use is made of ice-cream in the preparation of "ice-cream soda," and where the common ice-cream freezer fails to retain the cream in proper frozen condition for any considerable length of time, because the salt and ice are unavoidably exposed to the surrounding atmosphere, and hence rapidly lose their cooling properties. Again, as the vessel which contains the cream is in direct contact with the ice, each opening of the vessel permits the entrance of surrounding atmosphere to the vessel, and so that the influence of that atmosphere upon the ice, so in direct contact with the vessel, is very great, tending to destroy the ice and its desirable effects.

The object of my invention is the construction of a refrigerator and cream-holding vessel combined, so that the ice and salt will not be exposed to surrounding atmosphere, but yet bring the cream-holding vessel into close relation to the surrounding cooling medium;
and the invention consists in the construction as hereinafter described, and particularly recited in the claim.

The refrigerator-case is in the form of a box A, having a cover B in its top and a door C at one end. The walls of the box are double, the space $a$ between the outer and inner walls being filled with any suitable non-heat-conducting material, as represented in Figs. 2 and 3. Within this double-walled casing a close metal wall is arranged and firmly supported, this wall forming an inner case D, open at one end to the door C, as seen in Fig. 3. The inner case D is so much smaller than the inside of the surrounding case as to leave a space $b$ between the two cases. The cover B opens directly into the said space $b$, as seen in Figs. 2 and 3. The size of the door-opening and the transverse area of the inner case are the same, so that the inner surfaces of the inner case are flush with the corresponding sides of the door-opening, as seen in Fig. 3.

E represents the vessel to contain the ice-cream. It is made of suitable sheet metal, its top open, as seen in Fig. 4. This vessel E in size and shape corresponds to the interior of the inner case, and so that set therein through the door-opening it will substantially fill the space and all its sides brought substantially into contact with the surrounding case D. The vessel at the door end is provided with a handle F, by which it may be withdrawn when the door is open.

The space $b$ in the casing is filled with ice and salt, then the cover closed. The frozen cream is placed in the vessel E, then the vessel set into the case D and the door closed. This brings the cream into substantially the same relation to the surrounding cooling medium as when the vessel is set directly into the ice and salt in the usual manner.

When a portion of the cream is required, the door is opened and the vessel pulled out like a drawer. The portion of cream being taken therefrom, the vessel is returned and the door closed; but in doing this the ice has not been exposed to the atmosphere, nor is it so exposed at any time; consequently the same quantity of ice will last much longer than in the usual method of handling ice-cream.

Not only is there a great saving in ice by my invention, but it affords a greatly-increased convenience in handling the cream and preserves the cream in so much better and more satisfactory condition than the usual methods or apparatus.

Instead of hinging the door to the case it may be attached to the front end of the drawer-like case, as seen in Fig. 5, but I prefer to hinge the door as described.

I am aware that a refrigerator has been constructed with a case having an inner chamber affording a space between said inner chamber and the casing, to be filled with ice, and do not, therefore, claim, broadly, such a refrigerator, the essential feature of this invention being the combination with such a refrigerator of a drawer-like vessel corresponding in size and shape to the interior of the inner chamber, and so that the outer surface of the said vessel may stand in substantially close contact with the inner surface of the chamber.

I claim—

A refrigerator composed of an outer double-walled case A, having a cover upon its top opening to the interior, combined with an inner case D less in size than the inside of the case A, one end open through the outer case, said opening in the case at least as large as the transverse area of said inner case D, a door adapted to close said opening, and a drawer-like vessel E of a size and shape corresponding to the interior of the said inner case, open upon its upper side, the outer surface of the said vessel adapted to stand in substantially close contact with the corresponding sides of said inner case, the said vessel removable from said inner case through the said door-opening, substantially as described.

WILLIAM L. EVERIT, JR.

Witnesses:
WILLIAM L. EVERIT,
EDSON N. SPERRY.